Patented Feb. 7, 1939

2,146,004

UNITED STATES PATENT OFFICE 2,146,004

MANUFACTURE OF SYNTHETIC RESIN

James A. Arvin, Chicago, Ill., assignor to The Sherwin-Williams Company, Cleveland, Ohio, a corporation of Ohio No Drawing. Application January 7, 1937, Serial No. 119,452

6 Claims. (Cl. 260—4)

The present invention relates to the manufacture of resins from substituted phenols and an aldehyde. It has particular reference to substituted phenols of the benzene series in which there are two free reactive positions and a hydrocarbon radicle of the type ranging from 4 to 12 carbon atoms. The radicle may be a straight-chained aliphatic group, a cyclic aliphatic group, an aryl radicle, an aralkyl radicle or derivatives of these. These substituted phenols may be obtained in various ways, such as for example, condensing monohydric alcohols or olefinic hydrocarbons with phenols, using suitable condensing agents. Phenols have their free para positions more reactive than other free positions toward such condensing reactions, and it is therefore believed that the alkyl phenols so made are largely para-compounds.

The objects of the invention are to improve the procedure by which such types of resins are made; to obtain more refined resins; to obtain benzene- and oil-soluble resins; to obtain resins readily soluble in mineral spirits for use in lacquers, varnishes and coating compositions, so that the resin is not precipitated upon dilution of the composition with thinners; to obtain resins which are more fast to light, air, alkali and water, for such uses as coatings; to obtain resins soluble in drying oils, for use in paints and varnishes; and for various other qualities which may distinguish the resins of this invention generally or specifically, from resins made heretofore from similar raw materials.

It has been known heretofore that resins may be made by condensation of para substituted aliphatic phenols, and aldehyde, both in the presence of alkali or acid. It is known that resins so formed vary in final characteristics according to the conditions which prevail when the condensation is made. It has therefore become a custom in the resin art to make the procedure empirical for certain desired properties.

The present invention may therefore be looked upon somewhat as an empirical procedure which has a directive influence upon the condensation reaction to produce desired characteristics. However, the empirical procedure is capable of considerable variation within the limits defined in the appended claims.

For example, commercially available resins used heretofore for coating compositions, have been necessarily chosen for light fastness. Such resins lack superior resistance to alkali, and it has not been possible to secure resins, which combine the features of light color, adequate fastness to light, and superior alkali resistance. By the process of the present invention these properties may be obtained in high degree in a single resin.

Generally stated the process comprises the liquefaction of the substituted phenol in a vehicle of water and volatile organic solvent in the presence of an amount of alkali, which may be substantially less than that molecularly equivalent to the phenol employed. The above preparation is preferably refluxed below the boiling point of water to provide an air-excluding vapor blanket over the mass, and to carry heat away in a somewhat controllable manner. Into this protected mass the chosen aldehyde is gradually run. Then the mass is heated with reflux action until it indicates a desired degree of progression in the condensation process. To stop the progress at this stage, the mass is acidified, thus to remove the alkali as the agent for favoring the desired condensation. The resulting mass is washed free from acid and/or salts, and may then be purified, as by steam injection, either wet or superheated. This is one way of removing residual volatile impurities and at the same time a convenient process to harden the resin. Vacuum evaporation of solvent and water may also be employed, or a combination of vacuum and steam treatment may be preferred. The temperature employed for such purification may be regulated to control the degree of hardening.

*The substituted phenol.*—A phenol with a hydrocarbon radicle is used. The radicle may be an aliphatic one having from 4 to 12 carbon atoms, for example as follows:

| Radicle | Carbon atoms |
|---|---|
| Tertiary butyl | 4 |
| Tertiary amyl | 5 |
| Alpha, alpha, gamma, gamma-tetramethyl butyl | 8 |
| Alpha, alpha, gamma, gamma, epsilon, epsilon-hexamethyl hexyl | 12 |

There are of course intermediate aliphatic radicles, which may be used. The present invention has been carried out with the 4 carbon aliphatic chain, and the 12 carbon aliphatic chain, and also with chains which have an even number and an odd number of carbon atoms. The aliphatic chain may be straight or cyclic. Likewise aromatic radicles may be used or alkylated aryl radicles, or arylated alkyl radicles.

The method by which the said phenols are prepared is not of essential concern for obtaining desired results, but the purity of the substituted phenol may be of importance. Therefore, the purity must be considered where pale and clear resins are the objective. In such cases, care should be taken to use highly purified phenols, relatively free from such substances, particularly other phenols, which may also condense with aldehyde to form dark or troublesome resins which contaminate the desired resin.

*The aldehyde.*—Formaldehyde in the form of 38% to 40% water solution called formalin is the prefered aldehyde, but other concentrations and other forms of aldehyde may be used. The amount of aldehyde depends upon the kind of resin desired. When the molecular ratio of formaldehyde to the substituted phenol is in the range with limits of 1.3 to 1 and 1.5 to 1 the resulting resin gives excellent "gas-proofing" qualities to tung oil. By this term is meant the ability of films to dry clear rather than in wrinkles or frosted, in the presence of combustion gases, which condition is encountered in baking enamel finishes. As the aldehyde to phenol ratio is increased the "gas-proofing" property is lessened. A higher aldehyde content such as a ratio of 2.2 to 1 or 2 to 1 of the substituted phenol, gives pale, light-fast resins which are very reactive with tung oil, the nature of the reaction being not well understood.

*Alkali.*—Wherein the term alkali is here used, it indicates alkaline agents, such as sodium or potassium carbonate, sodium or potassium hydroxide, calcium hydroxide, ammonia, ammonium carbonate, etc. However, the preferred alkali is sodium or potassium hydroxide because these are the stronger and are non-volatile common alkalis, give greater assurance of light colored resins, and form soluble salts with common acids which may be used in the process.

*The solvent.*—The solvent is one which is normally immiscible with water, such as the various volatile hydrocarbon solvents, as distinguished from the water soluble or miscible solvents such as alcohol or acetone. A solvent is preferred which contains a fraction boiling below the boiling point of water, thus to provide a vapor blanket below the normal boiling point of water. Benzene, toluene, mineral spirits and the like are satisfactory. Mineral spirits are preferred, such as the types which are to be used later with the resin when it is in a varnish composition. It appears that the formation of the resin in the presence of such a solvent is more conducive to making the resin soluble in that solvent. A gasoline cut of fairly high solvent strength, of low specific gravity, with a boiling range of about 195° F. to 245° F. is a suitable solvent to provide with water a refluxable liquid medium at 160° F. to 180° F., at atmospheric pressure. A suitable cut is known as "Troluol", made by Anderson Prichard Oil Corporation of Oklahoma City, Oklahoma.

The solvent is recoverable up to about 90% to 95%, and the cheaper mineral spirit solvents are prefered to the more expensive benzene or toluene solvents.

*Functions of solvent.*—The solvent provides a means for removal of heat developed by the reaction, when the refluxing procedure is employed. It also provides a rather constant temperature mass. The mixed vapor of water and of solvent provides an air-excluding blanket to keep oxygen away from the mass, particularly from the alkaline phenol. An unexpected function of the solvent is its action in the process to produce a homogeneous liquid of the entire reaction mass, or of a large proportion of it, in spite of the fact that the solvent is normally immiscible with water. This homogeneity continues for a considerable period and may break at different stages depending upon changeable factors. The fact that the liquid may become homogeneous is believed to be one cause of the quick and successful functioning of the smaller quantity of alkali, compared to uses heretofore in condensation reactions, of equimolecular amounts of alkali. From 0.13 to 0.55 mole of alkali can thus be rendered as effective as 1 mole of alkali in prior processes using 1 mole of substituted phenol, giving pale, clear, soluble resins. After acidification of the reaction mass, which may occur before or after the breaking of homogeneity, the solvent gives to the mass a low viscosity and a low specific gravity. These permit easily washing out the acid and salts.

The resins made with the use of such solvents present greater solubility in oils and said solvents, than resins made from similar bases by processes not employing said solvents. It has been found that all the resins prepared by the examples herein given, and by variations of them, have been soluble in tung oil. They are generally soluble in all drying oils, such as tung oil, and linseed oil. The resins may thus be used in varnishes containing such oils, and produce varnishes which are fast to light, have high water resistance, and high alkali resistance, compared to resins made from the same bases by processes not employing such solvent.

The following examples illustrate several ways of carrying out the invention.

*Example I*

| Material | Parts by weight |
|---|---|
| Alpha, alpha, gamma, gamma tetramethyl butyl phenol | 206 |
| Water | 116 |
| Mineral Spirits (B. P. 195° F. to 245° F.) | 72 |
| Sodium hydroxide (25% solution in water) | 89 |
| Formalin (38 to 40% water solution) | 166 |
| Contains: | |
| Phenol moles 1 | |
| Alkali do 0.55 | |
| Aldehyde do 2.2 | |

The phenol, water and about 36 parts of the solvent are heated to a refluxing temperature until no solid phenol remains. Then with application of heat stopped, the caustic soda solution is carefully added with stirring. Then the formalin is added slowly in from 15 to 20 minutes as permitted by removal of the heat evolved. The temperature may rise 10° F. for example from 170° F. to 180° F. After a time the evolution of heat ceases, as indicated by the mass cooling. The mass is then refluxed for 2 to 2¼ hours. The homogeneous mass breaks into an emulsion-like mass before the indicated time has elapsed. Hydrochloric acid is added to a point of acidity to Congo red, using agitation for a time to insure uniform acidity. Then the remaining 36 parts of solvent are added, the water layer is removed, and the resin mass is washed to remove acid and salts. Two washings each with about 200 parts of water, are usually sufficient.

The resin layer is then heated to 300° F. and held for from 5 to 10 minutes, until it becomes quite hard and brittle, when the melted resin is cooled. This heating is accomplished by an out-side oil bath and a steam injection, at first slowly until the temperature is 230° to 240° F. After this a rapid rise may be used. If superheated steam is used, the period may be shortened, and the oil bath need not exceed 310° F. A yield of 235 to 240 parts of water-white resin is obtained.

A typical data log is shown for distillation and hardening of a resin:

| Time (min.) | Resin temp. | Oil bath temp. | Remarks |
|---|---|---|---|
|  | °F. | °F. |  |
| Start | 160 | 180 |  |
| 5 | 190 | 250 |  |
| 20 | 200 | 270 |  |
| 30 | 215 | 295 |  |
| 35 | 240 | 325 | Steam increased. |
| 42 | 260 | 350 |  |
| 46 | 280 | 360 |  |
| 50 | 295 | 350 |  |
| 60 | 300 | 360 | Resin poured. |

*Example II*

This is the same as Example I using only 135 parts of the same formalin solution, which is a ratio of about 1.8 moles of formaldehyde to 1 mole of the phenol. The product is almost water-white with a yield of 233 to 236 parts.

*Example III*

| Material | Parts by weight |
|---|---|
| Alpha, alpha, gamma, gamma, tetramethyl butyl phenol | 206 |
| Mineral spirits (B. P. 195° F. to 245° F.) | 108 |
| Water | 60 |
| Sodium hydroxide (25% solution in water) | 40 |
| Formalin (38% to 40%) | 97.6 |
| Contains: |  |
| The phenol ............moles.. 1 |  |
| Alkali .................do.... 0.25 |  |
| Aldehyde ..............do.... 1.25 |  |

The procedure is generally the same as in Example I, except that only 36 parts of the mineral spirits are first used, and 72 parts withheld until just before or just after acidification. The initial heating period is 2 hours. The final heating period at 300° F. is continued for about 20 minutes. The yield is about 215 to 220 parts of resin. The resin is not as pale or as fast to light, air and moisture as that from Example I, but in these respects it is better than commercial resins of the same type. It has a pronounced "gas-proofing" effect on tung oil in which it readily dissolves, and in this feature is bettter than the resin of Example I.

*Example IV*

| Material | Parts by weight |
|---|---|
| Alpha, alpha, gamma, gamma, epsilon, epsilon-hexamethylhexyl phenol | 262 |
| Water | 116 |
| Mineral spirits (B. P. 195° F. to 245° F.) | 72 |
| Sodium hydroxide (25% solution in water) | 89 |
| Formalin (38%-40%) | 166 |
| Contains: |  |
| The phenol ............moles.. 1 |  |
| Alkali .................do.... 0.55 |  |
| Aldehyde ..............do.... 2.2 |  |

The quantities and procedure are the same as in Example I, with a 12-carbon alkyl phenol used in place of the 8-carbon (octyl) phenol. The yield is 276 to 282 parts of resin which is hard and water-clear.

*Example V*

| Material | Parts by weight |
|---|---|
| Para tertiary butyl phenol | 750 |
| Water | 580 |
| Mineral spirits (B. P. 195-245° F.) | 360 |
| Sodium hydroxide (25% solution in water) | 445 |
| Formalin (38%-40%) | 830 |
| Contains: |  |
| The phenol ............moles.. 1 |  |
| Alkali .................do.... 0.55 |  |
| Aldehyde ..............do.... 2.2 |  |

This example employs a 4-carbon alkyl phenol, compared to Examble IV having a 12-carbon radicle, and the Examples I, II, and III having and 8 carbon alkyl radicle.

The phenol, water and 180 parts of the solvent are heated at 160° F. in reflux apparatus until the phenol is liquid. The alkali is added during 5 minutes with stirring, and followed by aldehyde in 15 minutes at a temperature from 160° F. to 180° F. It is refluxed for 1.8 hours, and then the remaining 180 parts of solvent is added. The mass remains homogeneous. It is acidified with hydrochloric acid as in Example I, then washed with water. The resin is hardened by heating to 300° F. in 50 minutes with superheated steam, and held at 300° F. for 5 to 10 minutes. In using the steam the heating is done slowly up to 235° F. to distill off volatile material, and then rapidly thereafter. The resin is brittle and water-clear. The yield is 905 to 910 parts of resin. The hardening process may be varied considerably. Use of steam may be discontinued at any temperature or not practiced at all. Heat initiates the hardening. For example, steam may be discontinued upon reaching 300° F. and thereafter heat alone at 300° F. or higher be applied.

*Example VI*

Repeat Example V reducing the formalin to 675 parts (a ratio of 1 mole of phenol to 1.8 moles aldehyde). After adding the formalin, heat for 2 hours. The mass is homogeneous up to the point of acidification. The yield is 890 to 895 parts of almost water-clear resin. The resins made by Example V and IV give pale varnishes which are fast to light, heat and damp air.

*Example VII*

| Material | Parts by weight |
|---|---|
| Para tertiary butyl phenol | 750 |
| Water | 580 |
| Mineral spirits (B. P. 195° F-245° F.) | 320 |
| Sodium hydroxide (25% solution in water) | 250 |
| Formalin (38%-40%) | 830 |
| Contains: |  |
| The phenol ............moles.. 1.0 |  |
| Alkali .................do.... .31 |  |
| Aldehyde ..............do.... 2.2 |  |

The phenol, water and all the solvent are heated to reflux at 160° F. until the phenol is liquid. Add the alkali in 5 minutes, and the aldehyde in 15 minutes at 160° F. to 180° F. Reflux for 2 hours. The mass remains homogeneous. Acidify and wash. Harden as in Example V. The yield is 903 to 913 parts of pale yellow resin.

Example VIII

| Material | Parts by weight |
|---|---|
| Para tertiary butyl phenol | 750 |
| Water | 300 |
| Mineral spirits (B. P. 195° F. to 245° F.) | 360 |
| Sodium hydroxide (25% solution in water) | 200 |
| Formalin (38%–40%) | 488 |
| Contains: | |
| The phenol _____ moles__ 1.0 | |
| Alkali _____ do____ .25 | |
| Aldehyde _____ do____ 1.30 | |

Liquify the phenol in the presence of all the water and 180 parts of the solvent at 160° F. in the reflux apparatus. During 5 minutes add the alkali, and during 10 minutes add the aldehyde. Reflux for 2¼ hours. Then add the remaining 180 parts of solvent, acidify and wash. Harden as in Example V. Yield 830 to 840 parts of pale yellow brittle resin.

Example IX

| Material | Parts by weight |
|---|---|
| Para tertiary amyl phenol | 820 |
| Water | 580 |
| Mineral spirits (B. P. 195°–245° F.) | 360 |
| Sodium hydroxide (25% solution in water) | 445 |
| Formalin (38%–40%) | 830 |
| Contains: | |
| The phenol _____ moles__ 1.0 | |
| Alkali _____ do___ .55 | |
| Aldehyde _____ do___ 2.2 | |

This shows a 5-carbon alkyl phenol. The procedure is the same as in Example V. Yield 970 to 980 parts of almost water-clear resin.

Example X

| Material | Parts by weight |
|---|---|
| Alpha, alpha, gamma, gamma, tetramethyl butyl phenol | 103 |
| Para tertiary butyl phenol | 75 |
| Water | 116 |
| Mineral spirits (B. P. 195° F.–245° F.) | 72 |
| Sodium hydroxide (25% solvent in water) | 89 |
| Formalin (38%–40%) | 166 |
| Contains: | |
| Octyl phenol _____ moles__ .5 | |
| Butyl phenol _____ do___ .5 | |
| Alkali _____ do___ .55 | |
| Aldehyde _____ do___ 2.2 | |

This example illustrates mixtures of substituted phenols to form mixed resins. The mixed phenols are melted in the water and 36 parts of the solvent at 160° F. in the reflux apparatus. The procedure follows as in Example I. The yield of water-clear resin is 207 to 210 parts.

Various changes may be made. The alkali need not be sodium hydroxide. The sodium may as well be potassium, and the carbonate may replace the hydroxide. The mineral spirits may have a wider boiling range than that above given, and may be changed to a different solvent such as toluene. A cyclic aliphatic radicle or an aryl radicle may replace the aliphatic radicles above given. These changes are exemplified as follows:

Example XI

| Material | Parts by weight |
|---|---|
| Para tertiary butyl phenol | 750 |
| Mineral spirits (B. P. 195 to 245° F.) | 360 |
| Sodium carbonate in water (13.8% solution) | 1060 |
| Formalin (38%–40%) | 830 |
| Contains: | |
| The phenol _____ moles__ 1. | |
| Alkali (hydroxide equivalent) _____ do___ .57 | |
| Aldehyde _____ do___ 2.2 | |

The phenol and 180 parts of the mineral spirits are refluxed at 160° F. to a molten mass. Heated carbonate solution is added. The formalin is added during a 20-minute interval and the batch refluxed for three hours. Then the remaining 180 parts of mineral spirits is added, and acidification practiced with hydrochloric acid. The acidified batch is washed with water and the resin hardened. With the proportions above given, the mass does not at any stage become entirely homogeneous, but there is evidenced a partial homogeneity characterized apparently by a large portion of the ingredients being in a homogeneous liquid form in which the remainder is suspended. In the homogeneous portion, there is evidence that the reaction progresses rapidly in accordance with this invention.

Example XII

| Material | Parts by weight |
|---|---|
| Alpha, alpha, gamma, gamma, epsilon, epsilon hexamethylhexyl phenol | 262 |
| Sodium carbonate in water (13.8% solution) | 212 |
| Formalin (38%–40%) | 166 |
| Contains: | |
| The phenol _____ moles__ 1. | |
| Alkali _____ do___ .57 | |
| Aldehyde _____ do___ 2.2 | |

The procedure is the same as in Example XI.

Example XIII

The sodium hydroxide of Example IV is replaced with 98 parts of a 31.6% solution of potassium hydroxide in water. The resin is light in color and yield is about 285 parts.

Example XIV

The sodium hydroxide of Example V is replaced with 490 parts of a 31.6% solution of potassium hydroxide in water. The resin is very light in color and yield is about 903 parts.

Example XV

| Material | Parts by weight |
|---|---|
| Para tertiary butyl phenol | 750 |
| Mineral spirits (B. P. 195–330° F.) | 180 |
| Water | 580 |
| Sodium hydroxide (25% solution) | 445 |
| Formalin (38%–40%) | 830 |
| Contains: | |
| The phenol _____ moles__ 1. | |
| Alkali _____ do___ .55 | |
| Aldehyde _____ do___ 2.2 | |

The procedure is the same as any of the above.

Example XVI

| Material | Parts by weight |
|---|---|
| Alpha, alpha, gamma, gamma, epsilon, epsilon hexamethyl-hexyl phenol | 262 |
| Toluene | 100 |
| Water | 116 |
| Sodium hydroxide (25% in water) | 89 |
| Formalin (38-40%) | 166 |
| Contains: | |
| The phenol_____moles__ 1. | |
| Alkali_____do____ .55 | |
| Aldehyde_____do____ 2.2 | |

The phenol, water and 50 parts of the toluene are heated to 160° F. The alkali is added in 5 minutes, followed by the formalin in a 15 to 20 minute period. The batch is refluxed for about 2 hours, the remaining toluene added, the batch acidified, washed and hardened as in Example I.

Example XVII

The composition of Example XVI is changed to substitute 36 parts of mineral spirits (B. P. 195 to 330° F.) for the toluene. The previous general procedure is followed, but it is preferred to use all the mineral spirits at the beginning, since the amount is smaller.

Example XVIII

The composition of Example XV is used, substituting for the mineral spirits 750 parts of toluene. At the beginning 250 parts of the toluene is used. The remaining 500 parts of toluene may be added at any time before washing. After the usual procedure is carried out through the reflux stage, the batch is acidified and washed, and then hardened.

Example XIX

| Material | Parts by weight |
|---|---|
| Cyclohexyl phenol | 885 |
| Mineral spirits (B. P. 195-330° F.) | 180 |
| Water | 580 |
| Sodium hydroxide (25% in water) | 445 |
| Formalin (38-40%) | 830 |
| Contains: | |
| The phenol_____moles__ 1 | |
| Alkali_____do____ .55 | |
| Aldehyde_____do____ 2.2 | |

The cyclohexyl phenol is ground to a fine powder and heated to 160° F. with water and mineral spirits. The slurry is stirred and the alkali added in 5 minutes followed by the formalin in 20 minutes at 160° F. to 180° F. Shortly after the addition of the formalin the cyclohexyl phenol goes into solution. The batch is refluxed for about 1.8 hours, acidified, and washed, and the resin is then hardened.

Example XX

The materials and procedure of Example XIX are followed with the same results, substituting for the 885 parts of cyclohexyl phenol, 850 parts of para phenyl phenol. The resin is hardened at 300° F. using superheated steam and simultaneously distilling off the solvent.

Example XXI

| Material | Parts by weight |
|---|---|
| Para tertiary butyl phenol | 750 |
| Mineral spirits (B. P. 195-330° F.) | 180 |
| Water | 670 |
| Ammonia solution (28% NH$_3$) | 160 |
| Formalin (38-40%) | 830 |
| Contains: | |
| The phenol_____moles__ 1 | |
| Alkali_____do____ .53 | |
| Aldehyde_____do____ 2.2 | |

The phenol, solvent, and water were heated to 160° F., then the ammonia was slowly added. The formalin was added within 20 minutes, and the whole refluxed for one hour. Complete homogeneity did not occur. The acidification was made in the regular way, and the resin hardened at 300° F. A yield of 865 parts of yellow brittle resin was obtained.

It is particularly to be noted that the resin obtained with ammonia is dark and not comparable to the pale resins available when using the alkali metal alkali agents. The homogeneous condition does not seem to be created, and this confirms a belief that the homogeneous condition contributes to the formation of lighter colored resins. This is possibly due to a hastening of some stage of the reaction so that coloring agents are not formed. And this theory is of course dependent upon a supposition that the coloring agents are some impurity, no doubt a product of certain side reactions.

The circumstances indicate that the reaction involving ammonia progresses somewhat differently than when the other alkalis are used. One or more stages of the reaction seem to occur under different conditions, resulting when alkali metals are used, in cutting down the time during which conditions favor formation of coloring ingredients.

Discussion

In practically all of the foregoing examples the characteristic homogeneity previously referred to, occurs for a considerable length of time during the reaction period. It appears that as the alkyl chain becomes longer the period of homogeneity becomes shorter. The examples with the octyl phenol showed homogeneity for about 15 minutes during the reaction period. It is of course to be understood that the period may vary according to the amount and character of the ingredients employed.

In the foregoing examples the resins obtained are potentially reactive when formed in the reflux apparatus. After acidification the resin may be in part or wholly dissolved in solvent, and the mass may appear like an emulsion. Removal of solvent at lower temperatures leaves a mass which may be solid, or viscous, or gummy, and which may be hardened by higher heat, or prolonged lower heat. The invention contemplates that this potentially reactive resin may be removed as a product of the invention for such further uses as may be desired. However, because the hardened resins are soluble in tung oil, other oils, and various hydrocarbon solvents, it is more convenient to harden them at once when they are intended for incorporation into varnishes and other coating compositions.

It is generally known that alkyl phenols, including cresols and other substituted phenols having also an aliphatic radicle, especially in position para to the phenol group, may be reacted with aldehydes, such as formaldehyde, paraformaldehyde, hexamethylene-tetramine, acetaldehyde and paraldehyde, to produce resins. These resins vary in character and some are soluble in oils and hydrocarbon solvents. Equimolecular weights of aldehyde and phenol, and more or less of the aldehyde are also known to produce variances in the resin properties. Other facts about such resin-forming reactions are known in the art.

With the lower carbon chains in substituted phenols, the acid contact agents tend to produce oil soluble resins, and alkaline contact agents tend to produce oil-insoluble resins. With the higher alkyl phenols both acid and alkali contact agents may produce oil-soluble resins. However, where light-colored resins have been desired, suitable for use in coating compositions, a high ratio of aldehyde to phenol has been used, with a large amount of alkali. Such resins heretofore have not had the property of providing high alkali-resistance to varnishes and the like made from them.

The alkali used heretofore has been strong alkali metal hydroxide or ammonia. It is also known to use an amount of alkali to convert all the phenol first into a phenate salt, or to use less than such amount. However, where higher alkylated phenols and less than equimolecular amounts of alkali have been used, the mass is not homogeneous, and time period for reaction is very long, in order to permit use, release, and reuse of the alkali to use up all of the phenol.

The condensation reactions heretofore employed involving the higher alkylated phenols, have been limited to use of phenols having an aliphatic radicle of from 4 to 8 carbon atoms. They have employed only water as the vehicle for the reaction. Some have employed reducing agents, such as oxalate to prevent oxidation, and an atmosphere of nitrogen as a protective blanket to avoid discoloration by some action in the phenol in the presence of the alkali, presumably oxidation by air.

The present invention improves upon the procedures heretofore known by producing better resins, with simpler procedure in a shorter time. Shortening the time for condensation limits the extent to which other reactions may go, and also limits the possibilities of darkening by oxidation. Thus, clearer and whiter resins result.

The improvement includes the use of solvent and water as the vehicle for the condensation. The solvent and water in a reflux apparatus provide a blanket of vapor which protects the mass from oxidation. Accordingly, no nitrogen blanket, or reducing agent need be employed. It also disperses the resin formed, and permits a minimum amount of alkali to be more effective upon the initial larger equivalent amount of the phenol. A shorter time for reaction is permitted. Because the reaction mass with such solvent may attain a homogeneous condition for a short or long period, the time is further shortened, resulting in greater degree of clarity and whiter colors.

Because the resin is formed and maintained in a solvent, it is well dispersed. It is subject to further condensation with itself. This subsequent condensation theoretically may take place to form compact or mass molecules, or to form long linear molecules. It is believed that the greater dispersion of the resin favors the formation of the linear type. The general concensus of opinion is that the compact type of resins with numerous cross-linkages are more insoluble types.

The improvements have been shown to apply to a greater range of alkyl phenols than heretofore known. Although this type of resin has been made heretofore by various procedures from alkyl phenols having from 4 through 8 carbons in the alkyl radicle, the present invention readily permits using alkyl derivatives up to at least and including 12 carbon atoms, and also aryl phenols, with the same facility as the lesser alkyl radicles, and by a common procedure. Therefore, the resins involving the aryl radicles and the alkyl radicles of from 9 through 12 carbons are entirely new to the art. It is known that procedures used heretofore for alkyl phenols under 9 carbon atoms have not been applicable for alkylated phenols having 9 or more carbon atoms in the alkyl radicle. The use of a different liquid medium for the condensation reaction no doubt contributes greatly to the application of a single process using alkyl phenols of under 9 carbons and alkyl phenols of over 8 carbons and up through 12 carbons.

The use of a hydrocarbon solvent which is immiscible with water appears to contribute a strong force in the process, producing entire or partial homogeneity, and speeding up the reaction. Where homogeneity is entire it remains so for varying time periods, depending upon conditions. The type of homogeneity has characteristics different from that known heretofore in similar reactions through the use of solvents which are miscible with water, such as alcohol or acetone. It is well known that reactions in general proceed faster in homogeneous mixtures, but where such mixtures have been produced heretofore with solvents like alcohol, the mixture is changed with respect to its aqueous character to such an extent that ionization or other factors appear to be interfered with resulting in slowing down the reaction. It is well known in this connection in the synthetic resin field that phenolaldehyde reactions may be slowed down by the use of alcohol in order that the kinetics of the reaction may be studied. The type of homogeneity produced by the water-immiscible solvents greatly accelerates the reaction, and such result is an unexpected one. As an advantage, the quicker reaction assures prompt completion of the primary or resin-producing reaction, with less time-exposure for extension of unknown secondary reactions which produce coloring and other impurities.

The reaction so conducted permits use of less alkali as heretofore explained. The shorter time in particular permits a higher rate of resin-production with any particular unit. Other economies are also obvious.

It is to be understood that the resins derived by the process and from the materials herein described are not limited to use in varnishes and the like. However, where such use is desired, it is preferred to use phenols having a tertiary hydrocarbon radicle, because experience with these and with alkali metal hydroxide in the process, has shown predominantly the production of light colored resins with fastness to light.

I claim:

1. A process for the manufacture of synthetic resinous material which comprises heating at a temperature in the range from 160° F. to 180° F. reacting proportions of formaldehyde and a substituted phenol of the benzene series having a hydrocarbon radical with from 4 to 12 carbon atoms in an aqueous liquid containing a volatile hydrocarbon unreactive solvent which is immiscible with water, said liquid containing alkali in the form of an alkali metal compound in quantity less than sufficient to convert all the phenol at once to the phenate salt, whereby during the reaction period a condition arises in which normally immiscible volatile hydrocarbon solvent becomes a constituent of a homogeneous aqueous phase with acceleration of the resin-forming reaction to complete the same in a time period short of 2½ hours, and at the completion of said reaction neutralizing the alkali in the reaction mass whereby to form an aqueous phase and a separable phase comprising said volatile solvent in which is dissolved potentially reactive resin subject to hardening by application of heat.

2. A process for the manufacture of synthetic resinous material which comprises heating at a temperature in the range from 160° F. to 180° F. reacting proportions of formaldehyde and a substituted phenol of the benzene series having a hydrocarbon radical with from 4 to 12 carbon atoms in an aqueous liquid containing a volatile hydrocarbon unreactive solvent which is immiscible with water, said liquid containing alkali in the form of an alkali metal compound in quantity less than sufficient to convert all the phenol at once to the phenate salt, whereby during the reaction period a condition arises in which normally immiscible volatile hydrocarbon solvent becomes a constituent of a homogeneous aqueous phase with acceleration of the resin-forming reaction to complete the same in a time period short of 2½ hours, at the completion of said reaction neutralizing the alkali in the reaction mass whereby to form an aqueous phase and a separable phase comprising said volatile solvent in which is dissolved potentially reactive resin subject to hardening by application of heat, removing volatile solvent, and hardening said resin by application of heat.

3. A process for the manufacture of synthetic resinous material which comprises heating at a temperature in the range from 160° F. to 180° F. reacting proportions of formaldehyde and a substituted phenol of the benzene series having a hydrocarbon radical with from 4 to 12 carbon atoms in an aqueous liquid containing a volatile hydrocarbon unreactive solvent which is immiscible with water, said liquid containing alkali in the form of an alkali metal compound in quantity less than sufficient to convert all the phenol at once to the phenate salt, whereby during the reaction period a condition arises in which normally immiscible volatile hydrocarbon solvent becomes a constituent of a homogeneous aqueous phase with acceleration of the resin-forming reaction to complete the same in a time period short of 2½ hours, at the completion of said reaction neutralizing the alkali in the reaction mass whereby to form an aqueous phase and a separable phase comprising said volatile solvent in which is dissolved potentially reactive resin subject to hardening by application of heat, and subjecting said liquid to the action of superheated steam to remove said solvent and to harden the resin.

4. The process of claim 1 in which the alkali is alkali metal hydroxide.

5. The process of claim 1 in which the alkali is selected from the group consisting of alkali metal hydroxides and alkali metal carbonates.

6. The process of claim 1 in which the alkali is neutralized by acidifying with hydrochloric acid.

JAMES A. ARVIN.